United States Patent [19]

Hirata

[11] 4,339,030
[45] Jul. 13, 1982

[54] CHAIN CONVEYOR FOR MOVING ARTICLES ACCUMULATABLY AT AN INCREASED SPEED

[76] Inventor: Yasunari Hirata, 5-21, Toroku 5-chome, Kumamoto-shi, Kumamoto-ken, Japan

[21] Appl. No.: 185,405

[22] Filed: Sep. 8, 1980

[30] Foreign Application Priority Data

Apr. 3, 1980 [JP] Japan .................................. 55-42871

[51] Int. Cl.$^3$ .......................................... B65G 17/00
[52] U.S. Cl. ............................................... 198/779
[58] Field of Search .............................. 198/779, 631

[56] References Cited

U.S. PATENT DOCUMENTS 3,631,967 1/1972 Converse et al. ............... 198/779 X

FOREIGN PATENT DOCUMENTS 2735987 3/1979 Fed. Rep. of Germany ...... 198/779

Primary Examiner—Robert B. Reeves
Assistant Examiner—Paul A. Sobel
Attorney, Agent, or Firm—Robert E. Burns; Emmanuel J. Lobato; Bruce L. Adams

[57] ABSTRACT

A chain conveyor has feed rollers loosely fitted over chain rollers for conveying articles thereon at a speed higher than that of the chain rollers being driven on a rail means. The feed rollers have a diameter larger than that of the chain rollers such that the feed rollers, upon corotation with the chain rollers due to frictional engagement therewith under the weight of the articles, have a peripheral speed greater than that of the chain rollers. The articles can be stopped or accumulated at a desired position while allowing the feed rollers to be underrun without substantial slippage against the articles by rotating in a direction opposite to the direction of rotation of the chain rollers being continuously driven.

8 Claims, 4 Drawing Figures

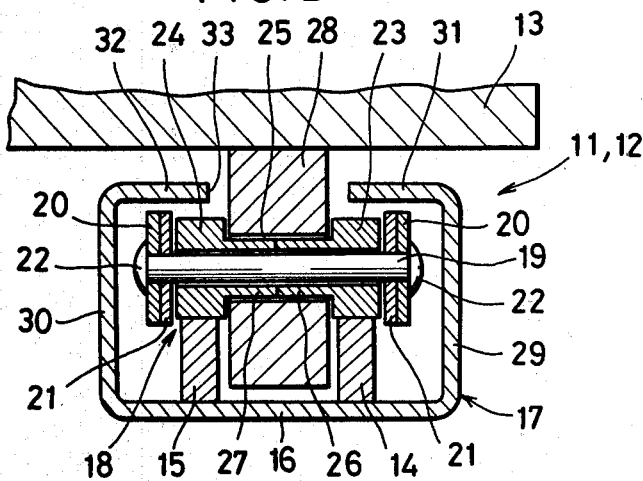
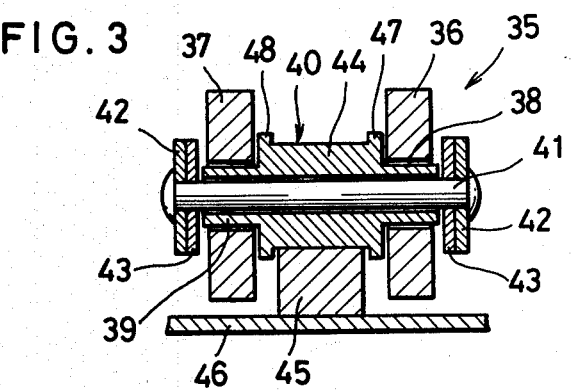
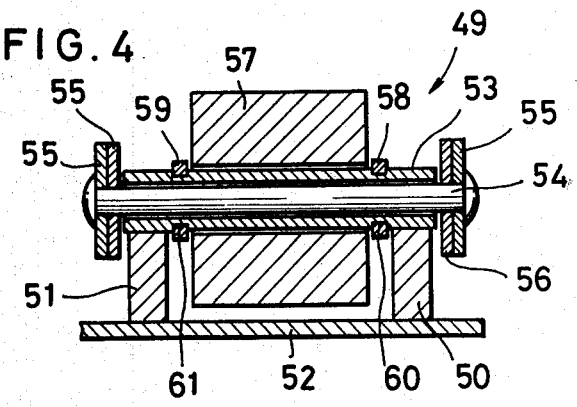

CHAIN CONVEYOR FOR MOVING ARTICLES ACCUMULATABLY AT AN INCREASED SPEED

BACKGROUND OF THE INVENTION

1. Field of the Invention

The present invention relates to a chain conveyor for feeding articles at a speed larger than that of chain rollers and accumulatably while allowing the chain rollers to be continuously advanced without slippage against the articles.

2. Prior Art

Known chain conveyors convey articles at a speed which is the same as that of chain rollers rollingly moving along a rail. Operating such chain conveyors fastener for an increased speed of feed results in louder noises and undue strains on conveyor parts. Lower operating speeds of the chain conveyors improve working environments through noise reduction, but render the chain conveyors less efficient.

SUMMARY OF THE INVENTION

A chain conveyor includes a feed roller or a pair of feed rollers loosely fitted over each of a plurality of chain rollers that are rotatably mounted respectively on a plurality of interconnected pins, the chain rollers riding on a rail means in rolling engagement therewith. The feed rollers have a diameter larger than that of the chain rollers for supporting thereon an article to be conveyed. When the article is placed on the feed rollers while the chain rollers are being driven, the feed rollers are frictionally engageable under the weight of the article with the chain rollers for substantial corotation therewith, so that the artical can be conveyed at a speed larger than that of travel of the chain rollers. When the article is stopped, the direction of rotation of the feed rollers are reversed on the chain rollers being continuously moved rollingly on the rail means, the feed rollers rotating without substantial slippage against the article held at rest.

It is an object of the present invention to provide a chain conveyor which can convey articles at a speed larger than that of chain rollers rollingly driven on a rail means.

Another object of the present invention is to provide a chain conveyor which allows articles thereon to be stopped or accumulated while at the same time permitting feed rollers supporting the articles thereon to be rotated in an opposite directed without substantial slippage or friction against the articles being at rest.

The above and other objects and advantages of the present invention will become apparent from the following description when taken in connection with the accompanying drawings which illustrate preferred embodiments of the present invention.

BRIEF DESCRIPTION OF THE DRAWINGS

FIG. 2 is an enlarged cross-sectional view of a chain conveyor according to an embodiment of the invention;

FIG. 3 is an enlarged cross-sectional view of a chain conveyor according to another embodiment; and FIG. 4 is an enlarged cross-sectional view of a chain conveyor according to still another embodiment.

DETAILED DESCRIPTION

Figure 1:
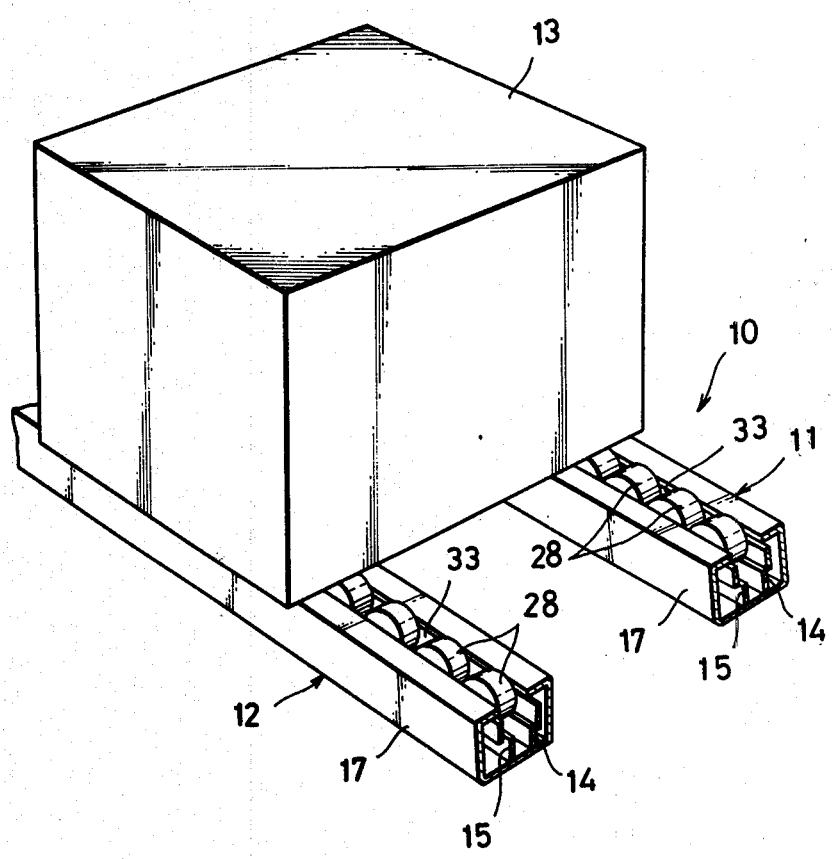
FIG. 1 is a fragmentary perspective view of a chain conveyor of the present invention.

As shown in FIG. 1, a chain conveyor, generally designated at 10, constructed in accordance with the present invention includes a pair of elongate chain units 11,12 spaced laterally from each other for conveying an article 13 therealong.

Each of the chain units 11,12 comprises a pair of laterally spaced parallel rails 14,15 (FIG. 2) mounted on a base 16 of a protective enclosure 17, and a plurality of chain rollers 18 (only one shown) rotatably fitted over a plurality of pins 19, respectively, interconnected by pin link plates 20,21 retained by pin heads 22.

The chain roller 18 has a pair of larger-diameter end portions 23,24 axially spaced from each other and riding on the rails 14,15, respectively, for rolling engagement therewith, and an intermediate smaller-diameter portion 25 extending between the larger-diameter portions 23,24, the intermediate portion 25 being split into a pair of halves 26,27. The pin link plates 20,21 have a width larger than the diameter of the end portions 23,24 of the chain roller 19 so that the lower edge of the link plates 20,21 is located below the upper edge of the rails 14,15 for guiding the chain roller 18 to roll on the rails 14,15 without running off. The feed roller 28 can be assembled onto the chain roller 18 by inserting the halves 26,27 of the intermediate chain roller portion 25 into the central hole in the feed roller 28 from opposite sides thereof.

A feed roller 28 having a diameter larger than that of the chain roller 18 is loosely fitted over the intermediate portion 25 of the chain roller 18 for supporting the article 13 thereon. The feed roller 28 partly extends between the rails 14,15.

The enclosure 17 includes a pair of spaced sidewalls 29,30 having a pair of opposed lips 31,32, respectively, directed toward the feed roller 28 in overhanging relation to the larger-diameter portions 23,24. The opposed lips 31,32 jointly define a slot 33 through which only the feed roller 28 partly projects outwardly. Thus, most of the movable components are concealed to render the chain conveyor 10 safe and sightly.

Operation of the chain conveyor 10 is as follows: The interconnected chain rollers 18 are driven by a suitable sprocket (not shown) for continuous rolling movement on and along the rails 14,15. When the article 13 is placed on the feed roller 28, the feed roller 28 is forced under the weight of the article 13 into frictional engagement for substantial corotation with the chain roller 18 that is pressed against the rails 14,15 for reliable rolling engagement therewith without slippage. Since the feed roller 28 is larger in diameter than the chain roller 18, the feed roller upon rotation has a peripheral speed larger than that of the chain roller 18, whereby the article 13 can be conveyed at a speed larger than that of advancing movement of the chain roller 18 along the rails 14,15. Theoretically, when the chain roller 18 is advanced at a speed of V, it has a peripheral speed of 2V. Assuming that the feed roller 28 has a diameter which is twice as large as the diameter of the intermediate portion 25 of the chain roller 18, the feed roller 28 then has a peripheral speed of 4V. The article 13 now can be conveyed at a speed four times as large as the speed of travel of the chain roller 18 along the rails 14,15. By selecting the diameter of the feed roller 28 as compared with that of the chain roller 18, the chain conveyor 10 can provide a wide range of speed of feed with the chain rollers 18 moving much more slowly and hence noiselessly.

The force of feed is generated by the friction between the chain roller 18 and the feed roller 28, and hence is substantially proportional to the weight of the article 13 that determines such friction between the rollers. When the article 13 produces an excessively large frictional force against the feed roller 28, or the article 13 is slowed down or stopped by an external force for accumulation, the feed roller 28 is slipped on the chain roller 18 that continues to move rollingly on the rails 14,15. The feed roller 28 now rotates in a direction opposite to the direction of rotation of the chain roller 18 without substantial slippage against the article 13. Stated otherwise, the feed roller 28 advances with the chain roller 18, while at the same time rotating in an opposite direction thereabout under the article 13 in rolling engagement therewith. Thus, a plurality of such articles 13 can be accumulated or held at rest allowing the chain conveyor 10 to be continuously operated without causing damages to the article 13 due to slippage or dragging thereon.

FIG. 3 shows another embodiment in which a chain conveyor unit 35 includes a plurality of pairs of parallel spaced feed rollers 36,37 (only one pair shown) each mounted rotatably on a pair of smaller-diameter end portions 38,39, respectively, of a chain roller 40 rotatably mounted on a pin 41 that is connected to adjacent pins by pin link plates 42,43. The chain roller 40 has an intermediate larger-diameter portion 44 riding rollingly on a rail 45 mounted on a base 46 and including a pair of flanges 47,48 adjacent to the end portions 38,39, respectively, the flanges 47,48 being located one on each side of the rail 45 in the axial direction of the chain roller 40 for guiding the chain roller 40 to move along the rails 45. The feed rollers 36,37 have a diameter larger than that of the intermediate portion 44 of the chain roller 40. With this arrangement, the chain conveyor unit 35 is simple in structure, easy to assemble, and can withstand an increased load because of the non-split chain roller 40 and the single rail 45.

According to an embodiment illustrated in FIG. 4, a chain conveyor unit 49 comprises a pair of parallel spaced rails 50,51 mounted on a base 52, a plurality of chain rollers 53 (only one shown) of a uniform diameter rotatably disposed at ends thereof on the rails 50,51 for rolling movement therealong and rotatably fitted respectively over a plurality of pins 54 interconnected by pin link plates 55,56, and a feed roller 57 fitted loosely over each of the pins 54 substantially centrally thereof and having a diameter larger than that of the chain roller 53. Thus, the feed roller 57 partly extends between the rails 50,51. A pair of axially spaced retainer rings 58,59 is disposed fixedly in a pair of slots 60,61 in the chain roller 53 which are located one on each side of the feed roller 57 for retaining the latter against axial displacement, the retainers 58,59 being disposed between the rails 50,51 in the axial direction of the chain roller 57. With such arrangement, since the chain roller 53 travels on the parallel rails 50,51 with the feed roller 57 as loaded by an article being located therebetween, the chain rollers 53 can stably travel along the rails 50,51. The chain roller 53 is relatively simple in structure, and hence can easily and inexpensively be manufactured with precision.

While certain preferred embodiments have been shown and described, it should be noted that various changes and modifications may be made therein without departing from the scope of the appended claims.

What is claimed is:
1. A chain conveyor comprising:
   (a) rail means; and
   (b) a roller chain including a plurality of interconnected pins, a chain roller rotatably fitted over each of said pins and riding on said rail for being rollingly drivable therealong, and feed roller means having a diameter larger than that of said chain roller and loosely fitted over said chain roller for supporting thereon an article to be conveyed;
   (c) said feed roller means being frictionally engageable under the weight of the article with said chain roller for substantial corotation therewith upon said chain roller's being rollingly driven on said rail, whereby the article on said roller can be conveyed at a speed larger than that of travel of said chain roller; and
   (d) said feed roller being rotatable in a direction opposite to the direction of rotation of said chain roller without substantial slippage against the article while the latter is being stopped, during rolling movement of said chain roller along said rail.

2. A chain conveyor according to claim 1, said rail means comprising a pair of parallel spaced rails, said feed roller means comprising a single roller disposed rotatably on said chain rollers and partly extending between said spaced rails.

3. A chain conveyor according to claim 2, said chain roller comprising a pair of axially spaced larger-diameter portions riding respectively on said rails for rolling engagement therewith and an intermediate smaller-diameter portion extending between said larger-diameter portions and supporting said single feed roller rotatably thereon.

4. A chain conveyor according to claim 2, said chain roller having a pair of spaced retainers secured thereto and located one on each side of said single feed roller for retaining the latter therebetween against axial displacement, said retainers being disposed between said rails in the axial direction of said chain roller.

5. A chain roller according to claim 1, said rail means comprising a single rail, said feed roller means comprising a pair of parallel spaced rollers disposed rotatably on said chain roller and one on each side of said single rail in the axial direction of said chain roller.

6. A chain conveyor according to claim 5, said chain roller comprising a pair of axially spaced smaller-diameter portions supporting said parallel spaced feed rollers rotatably thereon, respectively, and an intermediate larger-diameter portion extending between said smaller-diameter portions and riding on said single rail for rolling engagement therewith.

7. A chain conveyor according to claim 6, said chain roller including a pair of axially spaced annular flanges disposed on said intermediate larger-diameter portion and one on each side of said single rail in the axial direction of said chain roller.

8. A chain conveyor according to claim 1, including an elongate enclosure housing said rail means and roller chain, and having a longitudinal slot through which said feed roller means protrude partly out of said enclosure.

* * * * *